United States Patent
Jeong et al.

(10) Patent No.: US 8,520,725 B2
(45) Date of Patent: Aug. 27, 2013

(54) DATA EQUALIZING CIRCUIT AND DATA EQUALIZING METHOD

(75) Inventors: Chun Seok Jeong, Icheon-si (KR); Jae Jin Lee, Icheon-si (KR); Chang Sik Yoo, Seoul (KR); Jang Woo Lee, Seoul (KR); Seok Joon Kang, Seoul (KR)

(73) Assignee: SK Hynix Inc., Gyeonggi-do (KR)

( * ) Notice: Subject to any disclaimer, the term of this patent is extended or adjusted under 35 U.S.C. 154(b) by 0 days.

(21) Appl. No.: 13/407,546

(22) Filed: Feb. 28, 2012

(65) Prior Publication Data

US 2013/0170537 A1 Jul. 4, 2013

(30) Foreign Application Priority Data

Dec. 29, 2011 (KR) .................. 10-2011-0146443

(51) Int. Cl.
*H03H 7/30* (2006.01)
(52) U.S. Cl.
USPC ........... 375/232; 375/226; 375/229; 375/230; 375/233; 375/316; 375/324; 375/340; 375/346; 375/350; 375/371; 375/373; 375/376; 455/63.1; 455/67.13; 455/114.2; 455/260; 455/296; 455/501; 370/335; 370/342; 327/147; 327/156; 327/551; 333/18; 333/28 R; 708/300; 329/360
(58) Field of Classification Search
USPC ................. 375/226, 229, 230, 232, 233, 316, 375/324, 340, 346, 350, 371, 373, 376; 455/63.1, 67.13, 114.2, 260, 296, 501; 370/335, 370/342; 327/147, 156, 551; 333/18, 28 R; 708/300; 329/360
See application file for complete search history.

(56) References Cited

U.S. PATENT DOCUMENTS

| | | | |
|---|---|---|---|
| 2005/0226355 A1* | 10/2005 | Kibune et al. | 375/348 |
| 2008/0107167 A1* | 5/2008 | Tung et al. | 375/232 |
| 2010/0329327 A1* | 12/2010 | Kato et al. | 375/233 |
| 2011/0317751 A1* | 12/2011 | Roethig et al. | 375/232 |

OTHER PUBLICATIONS

Seok Jun Kang, A 4.2Gb/s 10x OSR Adaptive Equalizer Using 1.4x Fractional Sampling Clock, Feb. 2011, 59 pages.
Jang-Woo Lee et al., Oversampling equalizer with sub-sample clock, 2011, Hanyang University, Republic of Korea.

* cited by examiner

*Primary Examiner* — Leon Flores
(74) *Attorney, Agent, or Firm* — William Park & Associates Patent Ltd.

(57) ABSTRACT

A data equalizing circuit includes an equalizer configured to control a gain of data according to a value of a control code and output a controller gain; and a detection unit configured to divide n cycles of the data into N periods, count data transition frequencies for n/N periods while changing the value of the control code, calculate dispersion values of data transition frequencies for 1/N periods of the data from the data transition frequencies for the n/N periods, and finally output the value of the control code corresponding to a largest dispersion value, wherein n is equal to or greater than 2 and is set such that boundaries of the respective n/N periods of the data have different positions in the 1 UI data.

17 Claims, 5 Drawing Sheets

DATA EQUALIZING CIRCUIT AND DATA EQUALIZING METHOD

CROSS-REFERENCES TO RELATED APPLICATION

The present application claims priority under 35 U.S.C. §119(a) to Korean application number 10-2011-0146443, filed on Dec. 29, 2011, in the Korean Intellectual Property Office, which is incorporated herein by reference in its entirety.

BACKGROUND

1. Technical Field

The present invention relates to a data equalizing circuit and a data equalizing method, and more particularly, to a data equalizing circuit of a data receiver circuit and a data equalizing method in a data receiver circuit.

2. Related Art

A data receiver circuit for receiving and outputting data has a data equalizing circuit to correct data transformations occurring in the course of transmitting data.

FIG. 1 is a circuit diagram of a conventional data equalizing circuit.

The conventional data equalizing circuit includes an equalizer 1 and a detection unit 2.

The equalizer 1 corrects data DATA according to a value of a control code EQ_CODE. The detection unit 2 detects a degree of transformation of the data DATA while changing the value of the control code EQ_CODE, and the detection unit 2 outputs a value of the control code EQ_CODE capable of optimally securing a data eye, as a final value. The detection unit 2 detects a degree of transformation of the data DATA according to a scheme of detecting transition positions of the data DATA.

FIG. 2 is a waveform diagram showing a scheme of detecting transition positions of the data DATA in the detection unit 2.

The detection unit 2 divides 1 UI (unit interval) of the data DATA corrected according to the value of the control code EQ_CODE into N periods (ten periods in this case), and counts data transition positions in synchronization with sampling clocks CLK(1) to CLK(10). The sampling clocks CLK(1) to CLK(10) possess the same frequency as the data DATA, and have a phase difference acquired by dividing 1 UI by N. Then, dispersions of counting values are calculated. This is process is performed for all respective values of the control code EQ_CODE while changing the value of the control code EQ_CODE. Finally, the detection unit 2 outputs the value of the control code EQ_CODE which has a largest dispersion value.

In order to more precisely determine a data transition distribution, an increased number of sampling clocks, which have a uniform phase difference, are needed in 1 UI. In this regard, if a number of sampling clocks with a high frequency are generated, a processing burden is imposed on the hardware, and power consumption increases.

SUMMARY

A data equalizing circuit and a data equalizing method in which a data transformation detection scheme is improved are described herein.

In one embodiment of the present invention, a data equalizing circuit includes: an equalizer configured to control a gain of data according to a value of a control code and output a controller gain; and a detection unit configured to divide n cycles of the data into N periods, count data transition frequencies for n/N periods while changing the value of the control code, calculate dispersion values of data transition frequencies for 1/N periods of the data from the data transition frequencies for the n/N periods, and finally output the value of the control code corresponding to a largest dispersion value, wherein n is equal to or greater than 2 and is set such that is boundaries of the respective n/N periods of the data have different positions.

In another embodiment of the present invention, a data equalizing circuit includes: an equalizer configured to control a gain of data according to a value of a control code and output a controller gain; a multi-phase locked loop configured to receive a reference clock and output N number of clocks having a frequency corresponding to 1/n times a frequency of the data with a phase difference of n/N; a data latching section configured to store the data as N number of latched data in synchronization with the N number of clocks, respectively; a data transition counting section configured to compare adjacent values of the N number of latched data and count data transition frequencies for n/N periods; a counting completion signal generating section configured to generate a counting completion signal when counting of the data transition frequencies for the n/N periods is completed; and a controller configured to calculate and store dispersion values of data transition frequencies for 1/N periods from the data transition frequencies for the n/N periods in response to the counting completion signal while changing the value of the control code, and output the value of the control code corresponding to a largest dispersion value, wherein n is equal to or greater than 2 and is set such that boundaries of respective n/N periods of the data have different positions.

In another embodiment of the present invention, a data equalizing method suitable for controlling a correction degree of a is data eye in response to a value of a control code includes a plurality of bits comprises: dividing n cycles of the data into N number of periods, and counting data transition frequencies for n/N periods while changing the value of the control code sequentially from a minimum value; calculating dispersion values of data transition frequencies for 1/N periods of the data of 1 UI (unit interval) from the data transition frequencies for the n/N periods according to respective values of the control code; and outputting the value of the control code when a dispersion value is largest among the dispersion values of the data transition frequencies for the 1/N periods, as a final control code, wherein n is equal to or greater than 2 and is set such that boundaries of the respective n/N periods of the data have different positions.

BRIEF DESCRIPTION OF THE DRAWINGS

Features, aspects, and embodiments are described in conjunction with the attached drawings, in which.

DETAILED DESCRIPTION

Hereinafter, a data equalizing circuit and a data equalizing method according to an embodiment of the present invention will be described below with reference to the accompanying drawings through embodiments.

Figure 1:
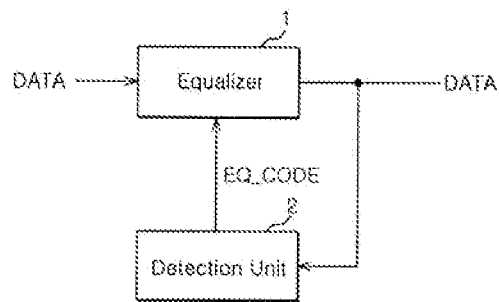
FIG. 1 is a circuit diagram of a conventional data equalizing circuit.
Figure 2:
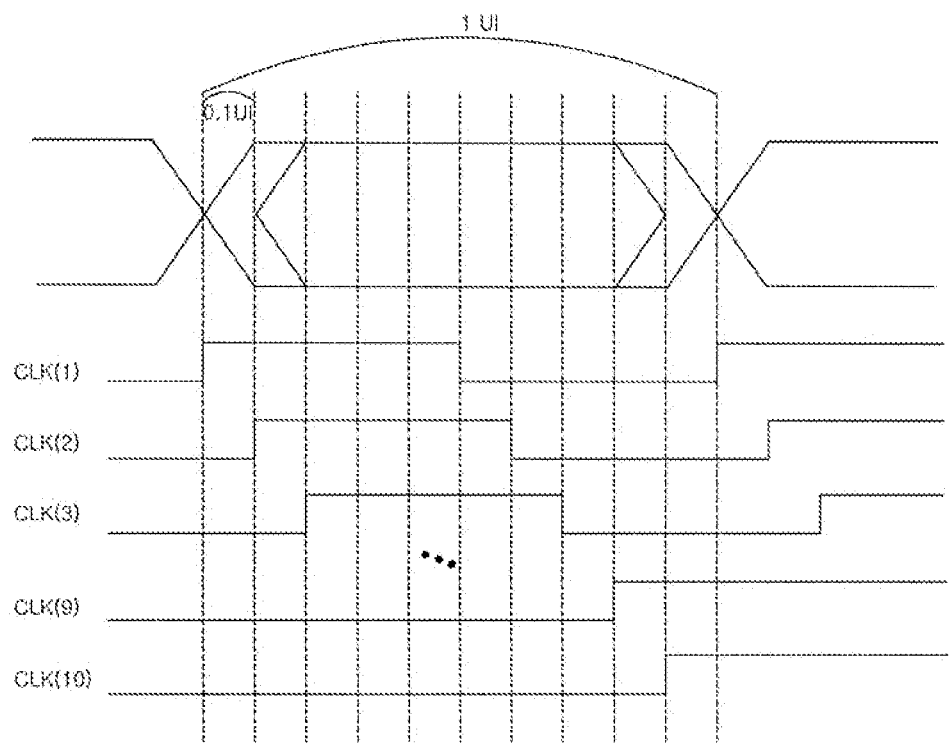
FIG. 2 is a waveform diagram showing a data transition detecting scheme of the conventional data equalizing circuit.
Figure 3:
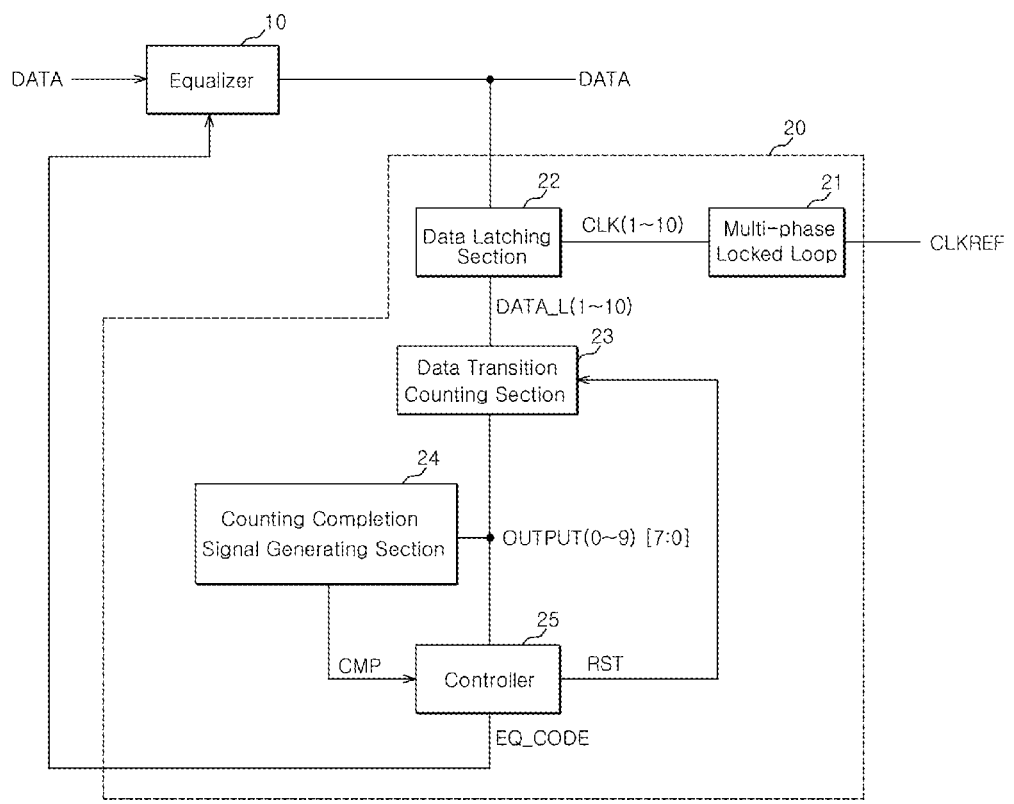
FIG. 3 is a circuit diagram of a data equalizing circuit in accordance with an embodiment of the present invention.

FIG. 3 is a circuit diagram of a data equalizing circuit in accordance with an embodiment of the present invention.

The data equalizing circuit includes an equalizer 10 and a detection unit 20.

The equalizer 10 is configured to control the gain of data DATA according to a value of a control code EQ_CODE and correct the transformation of the data DATA. The equalizer 10 may be realized as is generally known in the art.

The detection unit 20 is configured to detect a degree of transformation of the data DATA while changing the value of the is control code EQ_CODE, and output a value of the control code EQ_CODE capable of optimally securing a data eye, as a final value. The detection unit 20 detects a degree of transformation of the data DATA according to a scheme of detecting transition positions of the data DATA.

In detail, the detection unit 20 divides n cycles of the data DATA into N periods, counts data transition frequencies OUTPUT(0~9) of respective n/N periods while changing the value of the control code EQ_CODE, calculates dispersion values of data transition frequencies for respective 1/N periods, and finally outputs the value of the control code EQ_CODE when a dispersion value is largest.

The detection unit 20 includes a multi-phase locked loop 21, a data latching section 22, a data transition counting section 23, and a controller 25.

The multi-phase locked loop 21 is configured to receive a reference clock CLKREF and output N number of clocks CLK(1~10) having a frequency corresponding to 1/n times the frequency of the data DATA with a phase difference of n/N. n has a value equal to or greater than 2 and is set to ensure that positions of respective n/N periods of the data DATA become different from one another. The multi-phase locked loop 21 is a phased locked loop (PLL) used for changing a frequency and may be realized as is generally known in the art.

The data latching section 22 is configured to store the data DATA as N number of latched data DATA_L(1~10) in synchronization with the N number of clocks CLK(1~10). In detail, the data latching section 22 may be realized by latch flip-flops.

The data transition counting section 23 is configured to compare adjacent values among the N number of latched data DATA_L(1~10), check whether a data transition occurs in the respective n/N periods, and count the data transition frequencies OUTPUT(0~9) for the respective n/N periods.

The controller 25 is configured to calculate data transition frequencies for 1/N periods, which are obtained by dividing 1 UI (unit interval) by N, from the data transition frequencies for the n/N periods while changing the value of the control code EQ_CODE. Further, the controller 25 calculates and stores dispersion values of the data transition frequencies for the 1/N periods, and finally outputs the value of the control code EQ_CODE when a dispersion value is largest.

The detection unit 20 may further include a counting completion signal generating section 24 which is configured to generate a counting completion signal CMP. The detection unit 20 derives an optimum control code EQ_CODE while changing the value of the control code EQ_CODE, in the process of detecting a data transformation. In such a process, the counting completion signal CMP is a signal which is activated when counting of the data transition frequencies OUTPUT(0~9), for the n/N periods in respect to a corresponding control code EQ_CODE, is completed. When the activated counting completion signal CMP is inputted to the controller 25, the controller 25 calculates and stores dispersion values corresponding to the corresponding control code EQ_CODE.

Figure 4:
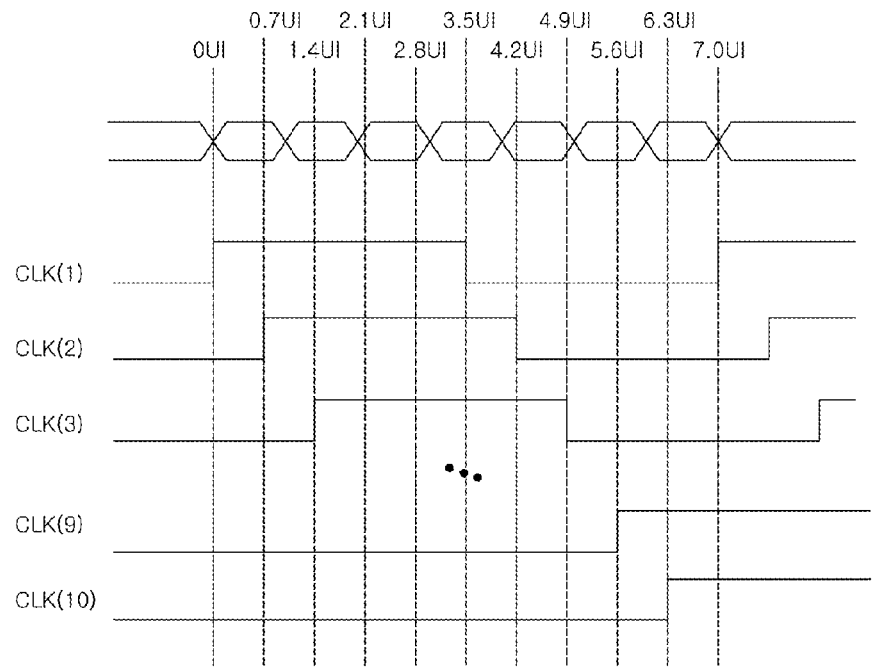
FIG. 4 is a waveform diagram showing a data transition detecting scheme of the data equalizing circuit in accordance with an is embodiment of the present invention.

FIG. 4 is a waveform diagram showing a data transition detecting scheme of the data equalizing circuit in accordance with the embodiment of the present invention.

Referring to FIG. 4, in an embodiment of the present invention, unlike the conventional art, data transition frequencies are counted using clocks CLK(1~10) having a frequency lower than the frequency of the data DATA. In FIG. 4, clocks CLK(1~10) having a frequency corresponding to 1/7 (that is, n=7) times the frequency of the data DATA are used. Also, in an embodiment of the present invention, data transition frequencies for respective periods are counted not by dividing the period of 1 UI (that is, 1 cycle of data) by N as in the conventional art but by dividing the data period of n cycles by N. In FIG. 4, data of n cycles are divided into 10 periods (N=10).

At this time, in order to ensure that the data transition frequencies for respective periods do not overlap with one another, setting is made such that positions of respective n/N periods on the data DATA are different from one another. This may be used for subsequently calculating data transition frequencies for 1/N periods. In FIG. 4, a first period corresponds to 0~0.7 that is within 1 UI, a second period corresponds to 0.7~1.4, a third period corresponds to 1.4~2.1, a fourth period corresponds to 2.1~2.8, a fifth period corresponds to 2.8~3.5, a sixth period corresponds to 3.5~4.2, a is seventh period corresponds to 4.2~4.9, an eighth period corresponds to 4.9~5.6, a ninth period corresponds to 5.6~6.3, and a tenth period corresponds to 6.3~7.0. As shown, the values of the tenths position of boundaries of each period within 1 UI is different. For example, the values of the tenths positions depicted in FIG. 4 are 7, 4, 1, 8, 5, 2, 9, 6, 3, and 0. Because all numbers of decimal places of boundaries of the respective periods are different from one another, positions of the respective n/N periods on the data DATA are set such that the positions are different from one another. All values of n and N satisfying this may be applied to an embodiment of the present invention.

In this way, in an embodiment of the present invention, since data transitions are detected using clocks having a frequency lower than that in the conventional art, a burden may be reduced in terms of hardware operation and current consumption even when a precise detection is necessary.

Figure 5:
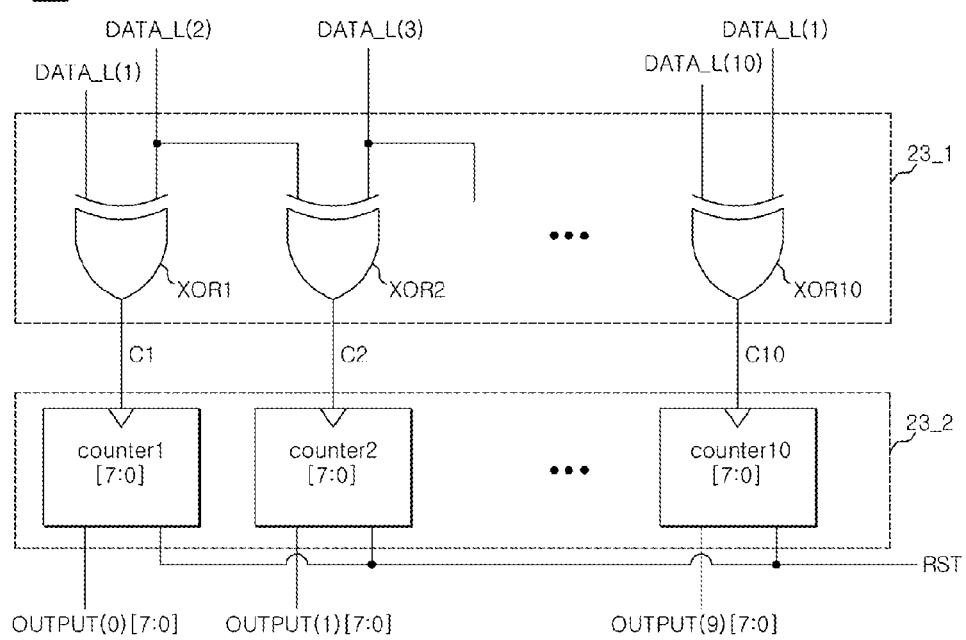
FIG. 5 is a circuit diagram showing an embodiment of a data transition counting section shown in FIG. 3.

FIG. 5 is a circuit diagram showing an example embodiment of the data transition counting section 23 shown in FIG. 3.

The data transition counting section 23 includes a comparison part 23_1 and a counter part 23_2.

The comparison part 23_1 includes N number of XOR gates XOR1 to XOR10 which are configured to XOR adjacent values of the N number of latched data DATA_L(1~10) and generate N number of comparison signals C1 to C10. The XOR gates XOR1 to XOR10 output 1 when the adjacent values of the latched data DATA_L(1~10) are is different from each other and output 0 when the adjacent values of the latched data DATA_L(1~10) are the same as each other.

In an embodiment, the first latched data DATA_L(1) is compared with the second latched data DATA_L(2), the second latched data DATA_L(2) is compared with the third latched data DATA_L(3), the third latched data DATA_L(3) is compared with the fourth latched data DATA_L(4), the fourth latched data DATA_L(4) is compared with the fifth latched data DATA_L(5), the fifth latched data DATA_L(5) is compared with the sixth latched data DATA_L(6), the sixth latched data DATA_L(6) is compared with the seventh latched data DATA_L(7), the seventh latched data DATA_L(7) is compared with the eighth latched data DATA_L(8), the eighth latched data DATA_L(8) is compared with the ninth latched data DATA_L(9), the ninth latched data DATA_L(9) is compared with the tenth latched data DATA_L(10), and the tenth latched data DATA_L(10) is compared with the first latched data DATA_L(1).

When values of adjacent latched data DATA_L(1~10) are the same (equal), it means that data values are not changed and thus a data transition has not occurred through adjacent periods. When values of adjacent latched data DATA_L(1~10) are different from each other (not equal, or not the same), it means that data values are changed and thus a data transition has occurred through adjacent periods.

The counter part 23_2 includes N number of counters counter1 to counter10 which are configured to respectively count the N number of comparison signals C1 to C10 and output the data transition frequencies OUTPUT(0~9) for the n/N periods. The counters counter1 to counter10 may be set to have values of a plurality of bits, and in the present embodiment, are set to be able to count 8 bits [7:0]. The counters counter1 to counter10 initialize counted values when an activated reset signal RST is applied.

Further, the counters counter1 to counter10 may be set to count the comparison signals C1 to C10 in synchronization with a control clock (not shown).

The data transition frequencies OUTPUT(0~9) for the n/N periods which are outputted from the counter part 23_2 are values acquired by counting data transition frequencies for periods obtained by dividing n cycles of the data DATA by N, and are subsequently used to calculate data transition frequencies for 1/N periods.

Figure 6:
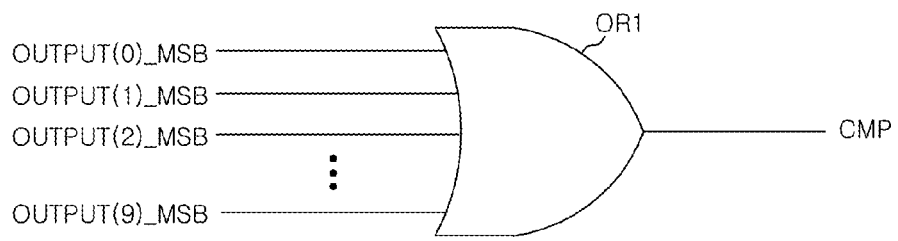
FIG. 6 is a circuit diagram showing an embodiment of a counting completion signal generating section shown in FIG. 3.

FIG. 6 is a circuit diagram showing an example embodiment of the counting completion signal generating section 24 shown in FIG. 3.

The counting completion signal generating section 24 includes an OR gate OR1 which is configured to be inputted with most significant bits OUTPUT(0~9)_MSB of the data transition frequencies OUTPUT(0~9) for the n/N periods and output the counting completion signal CMP.

As described above, the counting completion signal CMP is a signal which is activated when counting of the data transition frequencies OUTPUT(0~9) for the n/N periods with respect to a is corresponding control code EQ_CODE is completed. When even any one of the most significant bits OUTPUT(0~9)_MSB of the data transition frequencies OUTPUT(0~9) for the n/N periods, which have the plurality of bits, is 1, the counting completion signal CMP has the value of 1. If the activated counting completion signal CMP is inputted to the controller 25, the controller 25 calculates and stores dispersion values corresponding to the corresponding control code EQ_CODE.

Figure 7:
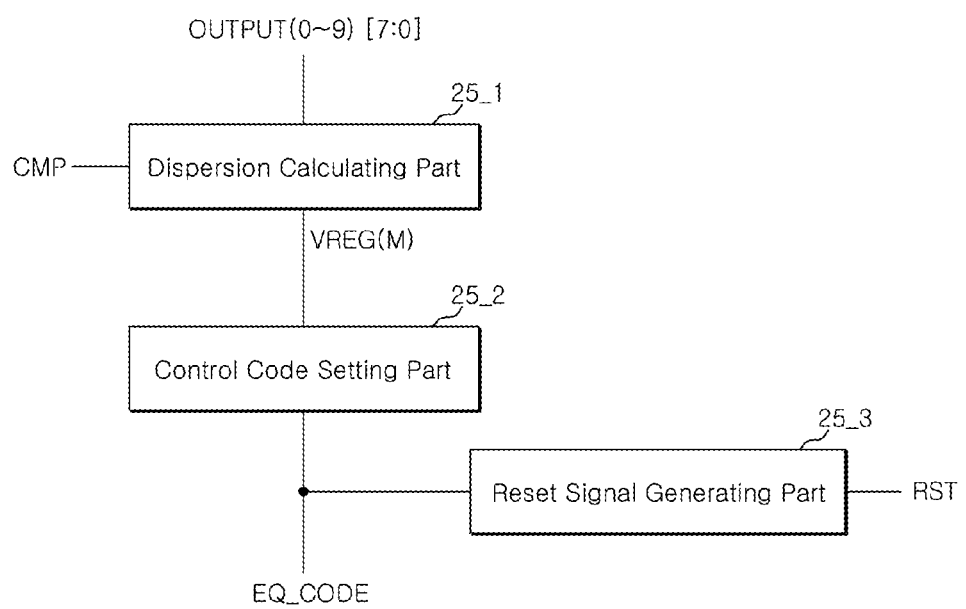
FIG. 7 is a circuit diagram showing an embodiment of a controller shown in FIG. 3.

FIG. 7 is a circuit diagram showing an example embodiment of the controller 25 shown in FIG. 3.

The controller 25 includes a dispersion calculating part 25_1 and a control code setting part 25_2.

The dispersion calculating part 25_1 is configured to receive the data transition frequencies OUTPUT(0~9) for the n/N periods, calculate the data transition frequencies for the 1/N periods, and calculate and output dispersion values VREG(M) of the data transition frequencies for the 1/N periods.

The dispersion calculating part 25_1 may receive the counting completion signal CMP. Since the counting completion signal CMP is a signal which indicates the completion of counting, only in the event that the activated counting completion signal CMP is inputted, the dispersion calculating part 25_1 receives the data transition frequencies OUTPUT(0~9) for the n/N periods.

The control code setting part 25_2 is configured to store the dispersion values VREG(M) for the respective values of the control code EQ_CODE while changing the value of the control code EQ_CODE, and finally output the value of the control code EQ_CODE corresponding to a largest dispersion value VREG(M).

An embodiment of the present invention is directed to derive the value of a control code EQ_CODE by which transformed data DATA is optimally corrected, while changing the value of the control code EQ_CODE. To this end, the control code setting part 25_2 stores the dispersion values VREG(M) for the respective values of the control code EQ_CODE while changing the value of the control code EQ_CODE, and outputs the value of a control code EQ_CODE having a largest dispersion value VREG(M) as a final value. The fact that a dispersion value VREG(M) is largest means that a data eye is sufficiently secured.

For example, the control code EQ_CODE, which is outputted by the control code setting part 25_2, may be set to 3 bits and may be changed from 000 to 111 one bit by one bit.

The controller 25 may further include a reset signal generating part 25_3. In an embodiment of the present invention, the data transition frequencies are counted while the value of the control code EQ_CODE is changed. Accordingly, when the value of the control code EQ_CODE is changed by the control code setting part 25_2, it may be necessary to reset all the values already counted by the counters counter1 to counter10 and newly count the data transition frequencies according to the changed value of the control code EQ_CODE.

The reset signal generating part 25_3 is configured to output the activated reset signal RST when the control code setting part 25_2 changes the value of the control code EQ_CODE.

The counter part 23_2 of the data transition counting section 23 initializes counted data transition frequencies OUTPUT(0~9) for the n/N periods when the activated reset signal RST is applied thereto.

Figure 8:
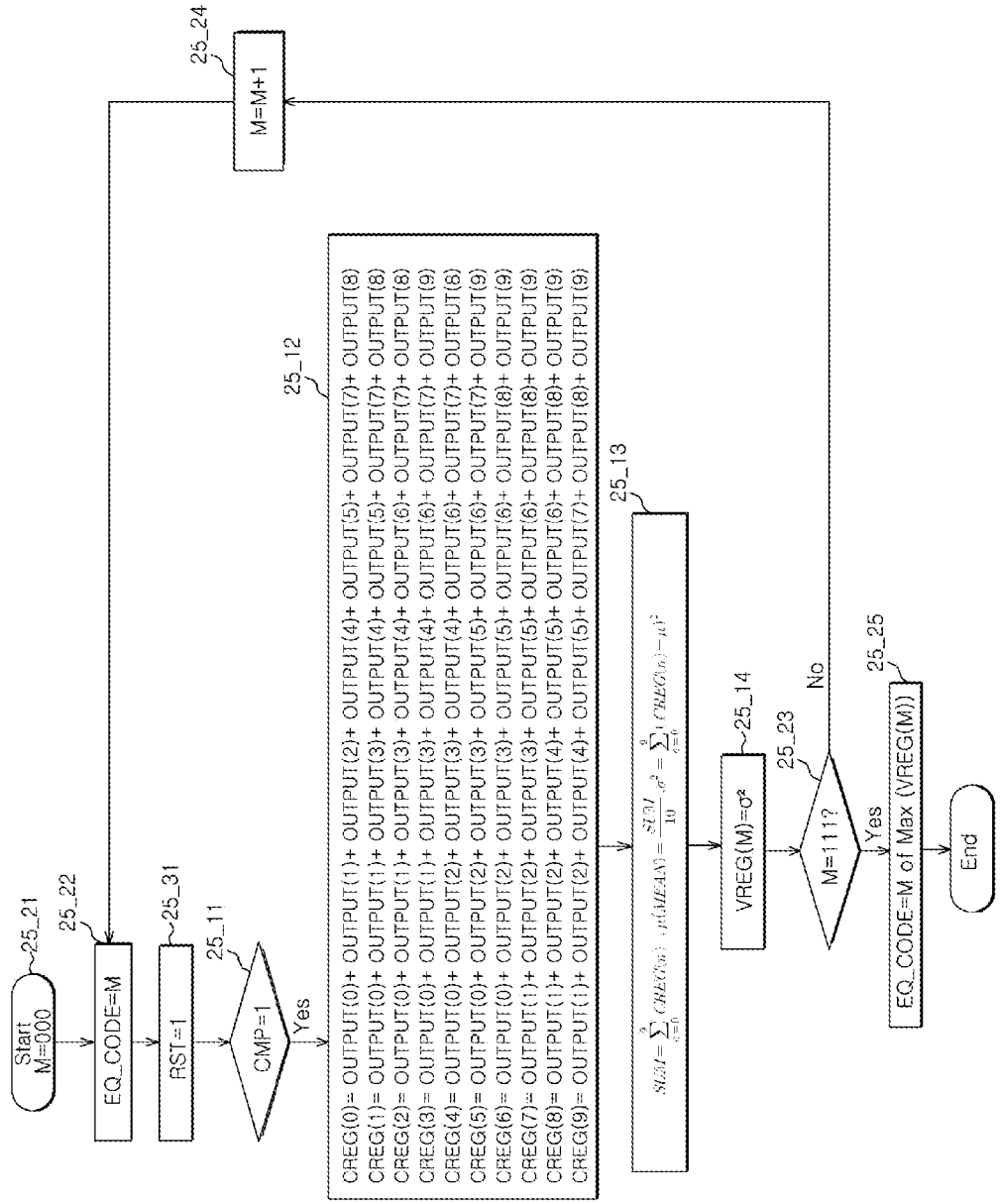
FIG. 8 depicts an algorithm showing operations of the controller shown in FIG. 7.

FIG. 8 is an algorithm showing detailed operations of the controller 25 shown in FIG. 7.

First, when the data equalizing circuit starts to operate, 000 is set as a stored value M (25_21). The control code setting part 25_2 sets the stored value M as the value of the control code EQ_CODE (25_22). The counter part 23_2 is reset by an initial reset signal RST (25_31). Thereafter, data transition frequencies OUTPUT(0~9) for n/N periods are counted by the counter part 23_2, and when any one of most significant bits OUTPUT(0~9)_MSB of the data transition frequencies OUTPUT(0~9) for the n/N periods becomes 1, the counting completion signal CMP is activated to 1 (25_11).

When the activated counting completion signal CMP is inputted to the dispersion calculating part 25_1, data transition frequencies CREG(0~9) for 1/N periods are calculated using the data transition frequencies OUTPUT(0~9) for the n/N periods (25_12), and dispersions $\sigma^2$ for the 1/N periods are calculated using the data transition frequencies CREG(0~9) for the 1/N periods (25_13). Calculating equations and methods are as given in the drawing.

Hereinbelow, a calculating equation for calculating the data transition frequencies CREG(0~9) for the 1/N periods will be described by using the data transition frequency CREG(1) as an example.

OUTPUT(0) is a value obtained by counting a data transition frequency occurring during the period of 0.0~0.7 among the periods acquired by dividing 7 cycles of data by 10. Also, OUTPUT(1) to OUTPUT(9) are values obtained by counting data transition frequencies occurring during the remaining periods.

CREG(0) has a value obtained by summing all data transition frequencies OUTPUT(0~9) for n/N periods which have a period of 0~0.1 UI among the periods divided from 1 UI data.

In other words, CREG(0) has a value obtained by summing OUTPUT(0) of the 0~0.7 period, OUTPUT(1) of the 0.7~1.4 period, OUTPUT(2) of the 1.4~2.1 period, OUTPUT(4) of the 2.8~3.5 period, OUTPUT(5) of the 3.5~4.2 period, OUTPUT(7) of the 4.9~5.6 period, and OUTPUT(8) of the 5.6~6.3 period.

CREG(1) has a value obtained by summing all data transition frequencies OUTPUT(0~9) for n/N periods which have the period of 0.1~0.2 UI among the periods divided from the 1 UI data. CREG(2) has a value obtained by summing all data transition frequencies OUTPUT(0~9) for n/N periods which have the period of 0.2~0.3 UI among the periods divided from the 1 UI data. CREG(3) has a value obtained by summing all data transition frequencies OUTPUT(0~9) for n/N periods which have the period of 0.3~0.4 UI among the periods divided from the 1 UI data. CREG(4) has a value obtained by summing all data transition frequencies OUTPUT(0~9) for n/N periods which have the period of 0.4~0.5 UI among the periods divided from the 1 UI data. CREG(5) has a value obtained by summing all data transition frequencies OUTPUT(0~9) for n/N periods which have the period of 0.5~0.6 UI among the periods divided from the 1 UI data. CREG(6) has a value obtained by summing all data transition frequencies OUTPUT(0~9) for n/N periods which have the period of 0.6~0.7 UI among the periods divided from the 1 UI data. CREG(7) has a value obtained by summing all data transition frequencies OUTPUT(0~9) for n/N periods which have the period of 0.7~0.8 UI among the periods divided from the 1 UI data. CREG(8) has a value obtained by summing all data transition frequencies OUTPUT(0~9) for n/N periods which have the period of 0.8~0.9 UI among the periods divided from the 1 UI data. CREG(9) has a value obtained by summing all data transition frequencies OUTPUT(0~9) for n/N periods which have the period of 0.9~1.0 UI among the periods divided from the 1 UI data.

By reflecting this, calculating equations of the data transition frequencies CREG(0~9) for the 1/N periods are given below.

$$CREG(0)=OUTPUT(0)+OUTPUT(1)+OUTPUT(2)+OUTPUT(4)+OUTPUT(5)+OUTPUT(7)+OUTPUT(8)$$

$$CREG(1)=OUTPUT(0)+OUTPUT(1)+OUTPUT(3)+OUTPUT(4)+OUTPUT(5)+OUTPUT(7)+OUTPUT(8)$$

$$CREG(2)=OUTPUT(0)+OUTPUT(1)+OUTPUT(3)+OUTPUT(4)+OUTPUT(6)+OUTPUT(7)+OUTPUT(8)$$

$$CREG(3)=OUTPUT(0)+OUTPUT(1)+OUTPUT(3)+OUTPUT(4)+OUTPUT(6)+OUTPUT(7)+OUTPUT(9)$$

$$CREG(4)=OUTPUT(0)+OUTPUT(2)+OUTPUT(3)+OUTPUT(4)+OUTPUT(6)+OUTPUT(7)+OUTPUT(8)$$

$$CREG(5)=OUTPUT(0)+OUTPUT(2)+OUTPUT(3)+OUTPUT(5)+OUTPUT(6)+OUTPUT(7)+OUTPUT(9)$$

$$CREG(6)=OUTPUT(0)+OUTPUT(2)+OUTPUT(3)+OUTPUT(5)+OUTPUT(6)+OUTPUT(8)+OUTPUT(9)$$

$$CREG(7)=OUTPUT(1)+OUTPUT(2)+OUTPUT(3)+OUTPUT(5)+OUTPUT(6)+OUTPUT(8)+OUTPUT(9)$$

$$CREG(8)=OUTPUT(1)+OUTPUT(2)+OUTPUT(4)+OUTPUT(5)+OUTPUT(6)+OUTPUT(8)+OUTPUT(9)$$

$$CREG(9)=OUTPUT(1)+OUTPUT(2)+OUTPUT(4)+OUTPUT(5)+OUTPUT(7)+OUTPUT(8)+OUTPUT(9)$$

Since a scheme for calculating the dispersions $\sigma^2$ of the data transition frequencies CREG(0~9) for the 1/N periods is generally known in the art, detailed description thereof will be omitted herein.

The dispersion calculating part 25_1 outputs the dispersion $\sigma^2$ as a dispersion value VREG(M) for the corresponding control code EQ_CODE(M) (25_14). Thereafter, the control code setting part 25_2 receives and stores the dispersion value VREG(M) and checks whether the control code EQ_CODE(M) is the final code 111 (25_23). If the control code EQ_CODE(M) is not the final code 111, the control code EQ_CODE(M) is changed by 1 bit (M=M+1) (25_24). Next, the values already counted by the counter part 23_2 are all reset, and the above-described process is repeated for the corresponding control code EQ_CODE(M).

If calculations are all completed up to a dispersion value VREG(M) corresponding to the control code EQ_CODE(M) as a final code 111, the control code setting part 25_2 finds a largest value among all stored dispersion values VREG(M), and outputs a stored value M at that time as a final control code EQ_CODE (25_25).

The equalizer 10 which receives the control code EQ_CODE optimally corrects transformed data DATA and outputs corrected data DATA.

As is apparent from the above descriptions, according to embodiments of the present invention, equalizing data, power consumption may be reduced and the burden of a hardware may be lessened.

While certain embodiments have been described above, it will be understood to those skilled in the art that the embodiments described are by way of example only. Accordingly, the data equalizing circuit and the data equalizing method described herein should not be limited based on the described embodiments. Rather, the data equalizing circuit and the data equalizing method described herein should only be understood in light of the claims that follow when taken in conjunction with the above description and accompanying drawings.

What is claimed is:

1. A data equalizing circuit comprising:
an equalizer configured to control a gain of data according to a value of a control code; and a detection unit configured to divide n cycles of the data into N periods, count data transition frequencies for n/N periods while changing the value of the control code, calculate dispersion values of data transition frequencies for 1/N periods of the data from the data transition frequencies for the n/N periods, and finally output the value of the control code corresponding to a largest dispersion value, wherein n is equal to or greater than 2 and is set such that boundaries of the respective n/N periods of the data have different positions in the 1 UI(unit interval) data, wherein the detection unit is implemented by hardware.

2. The data equalizing circuit according to claim 1, wherein the detection unit comprises:
a multi-phase locked loop configured to receive a reference clock and output N number of clocks having a frequency corresponding to 1/n times a frequency of the data with a phase difference of n/N;
a data latching section configured to store the data as N number of latched data in synchronization with the N number of clocks, respectively;
a data transition counting section configured to compare adjacent values of the N number of latched data and count the data transition frequencies for the n/N periods; and
a controller configured to calculate and store the dispersion values of the data transition frequencies for the 1/N periods from the data transition frequencies for the n/N periods while changing the value of the control code, and finally output the value of the control code corresponding to a largest dispersion value.

3. The data equalizing circuit according to claim 2, wherein the data transition counting section comprises:
a comparison part configured to compare adjacent values of the N number of latched data and generate N number of comparison signals; and
a counter part configured to respectively count the N number of comparison signals and output the data transition frequencies for the n/N periods.

4. The data equalizing circuit according to claim 3, wherein the comparison part outputs the comparison signal with a value of 1 when adjacent values of the latched data are the same, and the comparison part outputs the comparison signal with a value of 0 when the adjacent values of the latched data are not the same.

5. The data equalizing circuit according to claim 2, wherein the controller comprises:
a dispersion calculating part configured to receive the data transition frequencies for the n/N periods, and calculate and output the dispersion values of the data transition frequencies for the n/N periods; and
a control code setting part configured to store the dispersion values for respective values of the control code while changing the value of the control code, and finally output the value of the control code corresponding to a largest dispersion value.

6. The data equalizing circuit according to claim 5, wherein the data transition counting section initializes counted data transition frequencies for the n/N periods in response to a reset signal.

7. The data equalizing circuit according to claim 6, wherein the controller further comprises:
a reset signal generating part configured to output the reset signal which is activated when the control code setting part changes the value of the control code.

8. A data equalizing circuit comprising:
an equalizer configured to control a gain of data according to a value of a control code;
a multi-phase locked loop configured to receive a reference clock and output N number of clocks having a frequency corresponding to 1/n times a frequency of the data with a phase difference of n/N;
a data latching section configured to store the data as N number of latched data in synchronization with the N number of clocks, respectively;
a data transition counting section configured to compare adjacent values of the N number of latched data and count data transition frequencies for n/N periods;
a counting completion signal generating section configured to generate a counting completion signal when counting of the data transition frequencies for the n/N periods is completed; and
a controller configured to calculate and store dispersion values of data transition frequencies for 1/N periods from the data transition frequencies for the n/N periods in response to the counting completion signal while changing the value of the control code, and output the value of the control code corresponding to a largest dispersion value, wherein n is equal to or greater than 2 and is set such that boundaries of respective n/N periods of the data have different positions in the 1_UI (unit interval) data.

9. The data equalizing circuit according to claim B, wherein the data transition counting section comprises:
a comparison part configured to compare adjacent values of the N number of latched data and generate N number of comparison signals; and
a counter part configured to respectively count the N number of comparison signals and output the data transition frequencies for the n/N periods.

10. The data equalizing circuit according to claim 9, wherein the comparison part outputs the comparison signal with a value of 1 when the adjacent values of the latched data are the same and outputs the comparison signal with a value of 0 when the adjacent values of the latched data are not the same.

11. The data equalizing circuit according to claim 8, wherein the counting completion signal generating section generates the counting completion signal which is activated, when a value of a most significant bit of any one of the data transition frequencies for the n/N periods is 1.

12. The data equalizing circuit according to claim 8, wherein the controller comprises:
a dispersion calculating part configured to receive the data transition frequencies for the n/N periods when an activated counting completion signal is inputted, and calculate and output the dispersion values of the data transition frequencies for the 1/N periods; and
a control code setting part configured to store the dispersion values for respective values of the control code while changing the value of the control code, and finally output the value of the control code corresponding to a largest dispersion value.

13. The data equalizing circuit according to claim 12, wherein the data transition counting section initializes counted data transition frequencies for the n/N periods in response to a reset signal.

14. The data equalizing circuit according to claim 13, wherein the controller further comprises:
a reset signal generating part configured to output the reset signal which is activated, when the control code setting part changes the value of the control code.

15. A data equalizing method for controlling a correction degree of a data eye in response to a value of a control code including a plurality of bits, comprising:

dividing n cycles of the data into N number of periods, and counting data transition frequencies for n/N periods while changing the value of the control code sequentially from a minimum value;

calculating dispersion values of data transition frequencies for 1/N periods of the data of 1 UI (unit interval) from the data transition frequencies for the n/N periods according to respective values of the control code; and outputting the value of the control code when a dispersion value is largest among the dispersion values of the data transition frequencies for the 1/N periods, as a final control code, wherein n is equal to or greater than 2 and is set such that boundaries of the respective n/N periods of the data have different positions in the 1_UI data, wherein the step of dividing is performed by hardware.

16. The data equalizing method according to claim 15, wherein the counting of the data transition frequencies for the n/N periods comprises:

receiving a reference clock and outputting N number of clocks having a frequency corresponding to 1/n times a frequency of the data with a phase difference of n/N:

storing the data as N number of latched data in synchronization with the N number of clocks, respectively; and comparing adjacent values of the N number of latched data and counting the data transition frequencies for the n/N periods.

17. The data equalizing method according to claim 15, wherein, in the calculating of the dispersion values, the data transition frequencies for the n/N periods including the 1/N periods are summed for the respective 1/N periods of the data of 1 UI, and the dispersion values of summed results for the respective 1/N periods are calculated.

* * * * *